United States Patent
Cai et al.

[19]

[11] Patent Number: 5,711,410
[45] Date of Patent: Jan. 27, 1998

[54] CONVEYOR CONTROL SYSTEM

[75] Inventors: Chunsheng Cai, New Fairfield, Conn.; Pao-Ter Huang, Alpharetta, Ga.

[73] Assignee: United Parcel Service of America, Inc., Atlanta, Ga.

[21] Appl. No.: 595,665

[22] Filed: Feb. 2, 1996

[51] Int. Cl.[6] .................................................. B65G 47/26
[52] U.S. Cl. ................................. 198/460.1; 198/461.1
[58] Field of Search ................... 198/459.1, 460.1, 198/461.1, 461.2, 575, 576, 577

[56] References Cited

U.S. PATENT DOCUMENTS

| | | |
|---|---|---|
| 3,075,630 | 1/1963 | Fisk . |
| 3,485,339 | 12/1969 | Miller . |
| 3,486,339 | 12/1969 | Miller . |
| 3,743,090 | 7/1973 | Brown . |
| 3,817,368 | 6/1974 | Wentz . |
| 4,514,963 | 5/1985 | Bruno ........................ 198/460.1 X |
| 4,604,704 | 8/1986 | Eaves . |
| 4,653,630 | 3/1987 | Bravin . |
| 4,776,464 | 10/1988 | Miller . |
| 4,852,717 | 8/1989 | Ross . |
| 5,056,647 | 10/1991 | Rosenbaum ........................ 198/460.1 |
| 5,141,097 | 8/1992 | Oiry . |
| 5,165,520 | 11/1992 | Herve . |
| 5,181,820 | 1/1993 | Sjogren . |
| 5,201,397 | 4/1993 | Isaacs . |
| 5,284,252 | 2/1994 | Bonnet . |
| 5,341,916 | 8/1994 | Doane et al. ........................ 198/460.1 |
| 5,375,692 | 12/1994 | Staudinger et al. ................... 198/461.2 |
| 5,505,291 | 4/1996 | Huang . |

FOREIGN PATENT DOCUMENTS 3738-587-A  5/1989  Germany .

*Primary Examiner*—James R. Bidwell
*Attorney, Agent, or Firm*—Jones & Askew, LLP

[57] ABSTRACT

A conveyor control system and method for positioning an object at a desired location along a conveyor. The system and method detects objects moving along a conveyor and controls deceleration of the conveyor in order to position the object as desired. The system and method account for varying distances between objects on the conveyor and varying distances between objects and the desired position by calculating a delay period during which the conveyor is allowed to continue to accelerate before it is decelerated. At the end of the deceleration, the object reaches the desired location. The delay period is calculated by comparing the known acceleration and deceleration rates of the conveyor with the measured acceleration time of the conveyor from a starting time to the time the object is detected. The system and method are useful for stopping an object such as a package at the exit end of the conveyor.

26 Claims, 3 Drawing Sheets

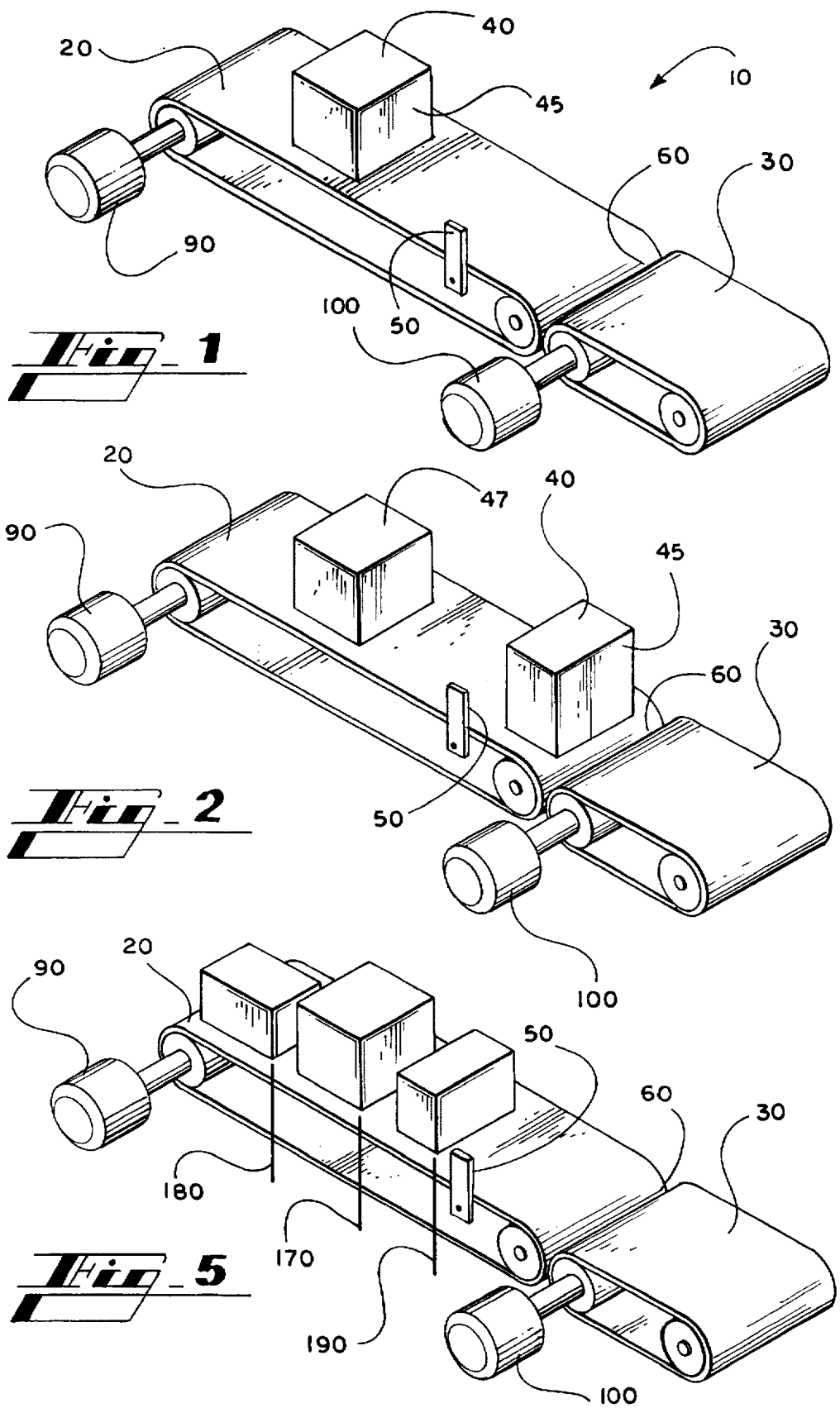

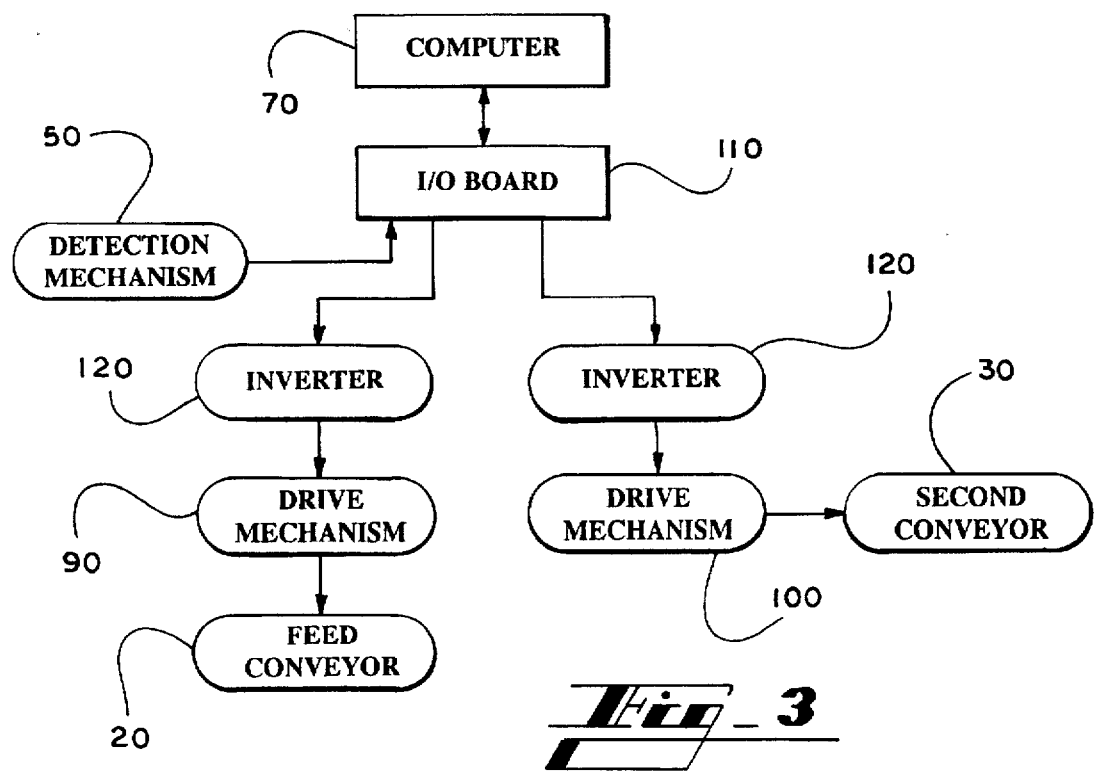
Fig_3
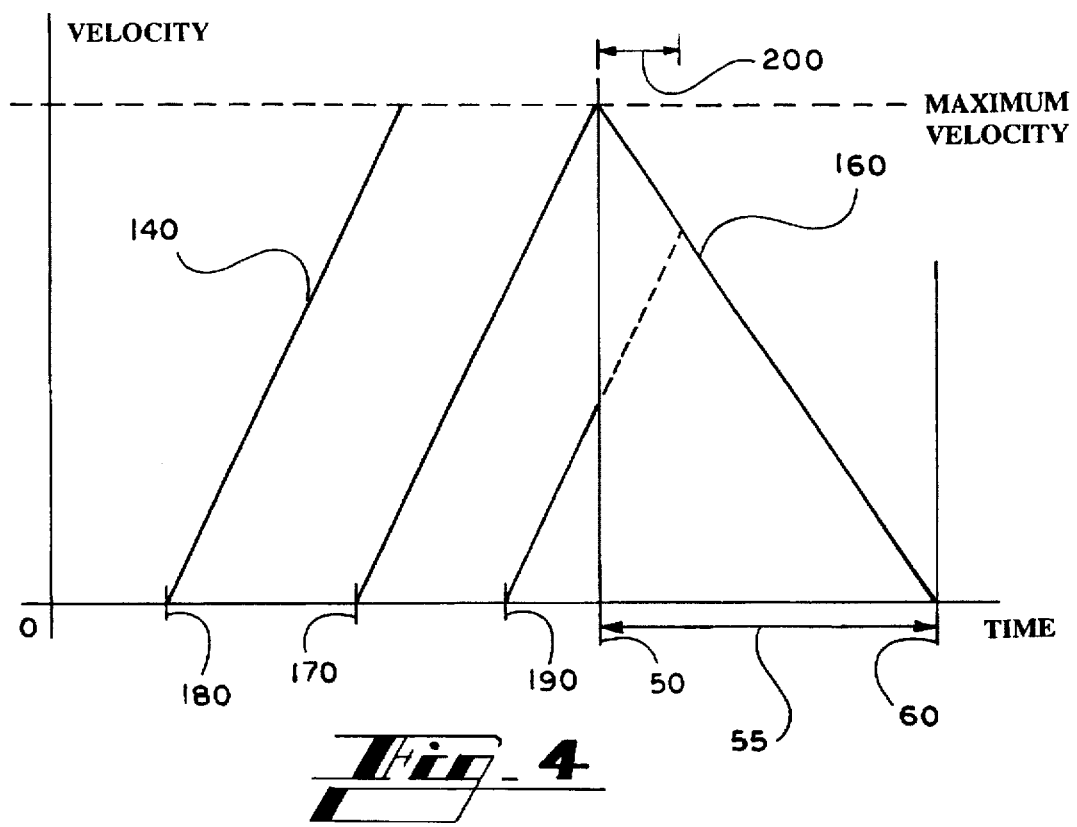
Fig_4

CONVEYOR CONTROL SYSTEM

RELATED APPLICATIONS

Appendix A hereto is a copy of an application entitled "Method and Apparatus for Sorting Articles Using a Matrix of Conveyor Cells" that is being filed concurrently herewith. That application is commonly owned by the assignee of the present application.

FIELD OF THE INVENTION

The present invention relates to material handling systems utilizing conveyors, and more particularly relates to a package conveyor control system useful in controlling material flow in a material handling system.

BACKGROUND OF THE INVENTION

In recent years the increased demand for high volume package handling and delivery services has necessitated the use, by package delivery companies, of a variety of package handling systems. Such package handling systems often include sorting systems in distribution hubs and complex conveying systems for loading and unloading transportation equipment. Often such systems integrate personnel with a variety of automated equipment.

In a typical conveying system or package sorting system, conveyors are used to transfer packages from a source such as a transportation vehicle to awaiting personnel or to a second conveyor being used in a complex conveying system or sorting system. In the case of transfer of a package to a second conveyor it often becomes desirable to transfer packages to the second conveyor individually, or one-at-a-time, so that packages are spaced along the second conveyor at a desired interval. Automatic devices for converting groups of packages on a conveyor to single file lines are known in the art However, even after this process, the packages on the first or "feed" conveyor are typically spaced apart along the conveyor with varying spacing between the packages. In order to achieve the desired spacing interval along the second conveyor, it is necessary to accelerate and decelerate the feed conveyor so that the package is moved from the feed conveyor to the second conveyor at the correct interval.

In order to control the positioning and spacing of articles on a conveyor, article synchronizing conveyors and article spacing systems have been developed. An article synchronizing conveyor is shown in U.S. Pat. No. 3,075,630 to Fisk, and an article spacing system is shown in U.S. Pat. No. 3,485,339 to Miller et al. The article synchronizing conveyor disclosed in U.S. Pat. No. 3,075,630 to Fisk includes constantly moving infeed and outfeed conveyors and a variable speed synchronizing conveyor positioned between the infeed and outfeed conveyors adapted to feed articles from the infeed conveyor to the outfeed conveyor. Articles moving along the synchronizing conveyor are sensed and the synchronizing conveyor is placed into a deceleration mode. When a selected point on the output conveyor reaches a predetermined position relative to the discharge end of the synchronizing conveyor, deceleration of the synchronizing conveyor is discontinued and the synchronizing conveyor is placed in an acceleration mode allowing the article to be transferred to the output conveyor by the synchronizing conveyor at a selected location on the outfeed conveyor.

The article spacing system disclosed in U.S. Pat. No. 3,485,339 to Miller et al. includes an entry conveyor, a spacing conveyor, and an approach conveyor utilized to feed packages to a weighing conveyor and subsequently to an exit conveyor. The spacing conveyor and the approach conveyor are selectively started and stopped to obtain desired spacing between packages having different lengths. A first package advanced along the spacing conveyor breaks a beam of a photo relay located at the exit end of the spacing conveyor and the entry end of the approach conveyor. The spacing conveyor transfers the first package to the approach conveyor and a second package is advanced onto the spacing conveyor. When the leading edge of the second package breaks the beam of a photo relay, the spacing conveyor decelerates to zero to prevent the spacing conveyor from advancing the second package onto the approach conveyor. The spacing conveyor remains stopped for a predetermined period of time with the second package in an overhanging relationship to the exit end of the spacing conveyor. After the predetermined time period runs, the spacing conveyor accelerates to advance the second package onto the approach conveyor.

In those prior art systems the feeding or synchronizing conveyor is moved continuously relative to a subsequent conveyor, or the feeding conveyor is simply stopped to prevent an object on the feeding conveyor from being transferred to the subsequent conveyor. It would be desirable to pre-position and stop the package when the leading edge of the package reaches a desired position such as the exit end of the feed conveyor. Then, when the next conveyor is ready to receive the package, the feed conveyor belt would be started again, thus moving the package into a known position on the second conveyor. Such positioning and stopping of the package would also be desirable when the package is transferred to awaiting personnel instead of to a second conveyor. It would be advantageous to have a conveyor control system which allows a package to be positioned and stopped at a predetermined position on the conveyor so that the package could be transferred with precision to a variety of desired destinations such as awaiting personnel, a chute or a subsequent conveyor.

SUMMARY OF THE INVENTION

The present invention provides a conveyor control system in which a package may be positioned at any desired position on a conveyor or, in a preferred embodiment, at the exit end of a conveyor in order to facilitate an efficient and accurate transfer of the package to its next immediate destination.

Described generally and according to one aspect, the present invention provides a method of positioning an object at a desired position on a conveyor comprising the steps of: transferring an object from an object source onto a conveyor, having a known acceleration rate and a known deceleration rate, at a position prior to the desired position on the conveyor; accelerating the conveyor at the known acceleration rate beginning at an initial time; measuring the acceleration time of the conveyor from the initial time to a time when the object reaches a detection point prior to the desired position on the conveyor; calculating a delay period, after the elapse of which, deceleration of the conveyor, at the known deceleration rate, will result in the object reaching a position adjacent to the desired position on the conveyor; and responsive to the elapse of the calculated delay period, decelerating the conveyor.

In a preferred embodiment of this aspect, the step of accelerating the conveyor comprises rotating the conveyor, during the acceleration time, so that the velocity of the conveyor increases as a function of the known acceleration rate. The object is detected and the delay period is calculated when its leading edge reaches the detection point. The delay period preferably is calculated by comparing (a) the measured acceleration time, (b) the known time for the conveyor to accelerate from a known starting velocity, at the known acceleration rate, to a known maximum velocity, and (c) the known time for the conveyor to decelerate, at a known deceleration rate, from the known maximum velocity to a known final velocity. Elapse of the delay period is begun after the object reaches the detection point. In many practical situations, the known initial velocity will be zero and the known final velocity will be zero.

The step of decelerating the conveyor preferably comprises: continuing to accelerate the conveyor at the known acceleration rate during the elapse of the delay period and, after elapse of the delay period, beginning deceleration of the conveyor. Alternately, where no delay period is necessary, the step of decelerating the conveyor may comprise arresting acceleration of the conveyor immediately after the leading edge of the object reaches the detection point. The step of decelerating the conveyor may also comprise braking the forward motion of the conveyor at a known deceleration rate and may result in the conveyor stopping when the object moves to a position adjacent to a desired position on the conveyor.

In a second aspect, the present invention provides a system for positioning an object at desired position on a conveyor, or in a preferred embodiment, at the exit end of a conveyor, comprising: a drive mechanism for operating a conveyor having a known acceleration rate and a known deceleration rate; a detection mechanism operative to detect movement of the object past a detection point along the conveyor; and a controller programmed and adapted to control the drive mechanism in order to accelerate and decelerate the conveyor. The controller is responsive to the detection mechanism and is further programmed to begin acceleration of the conveyor, to measure the acceleration time of the conveyor from a start time to a time at which the object reaches the detection point, to calculate a delay period after the elapse of which deceleration of the conveyor, at the known deceleration rate, will result in the conveyor stopping when the object travels to a position adjacent to the desired position on the conveyor; and to decelerate the conveyor at the known deceleration rate at the end of the delay period.

In a preferred embodiment of this second aspect, the present invention includes a belt conveyor driven by an alternating current motor; a detection mechanism comprising at least one photo cell relay; and an input/output means for translation of signaling between the controller and each of the detection mechanism and the drive mechanism. The controller is operative to process signal output from the detection mechanism to determine, as a function of the duration of the acceleration of the conveyor at the time the object is detected by the detection mechanism, whether to continue acceleration of the conveyor during the delay period, or whether to begin deceleration immediately after the object reaches the detection point in order to cause the conveyor to decelerate to a stopped position with the object positioned adjacent to the desired position on the conveyor. The controller may comprise a programmable computer. Additionally, this embodiment may comprise a braking means for braking movement of the conveyor and causing deceleration of the conveyor at a known rate.

Thus it is an object of the present invention to provide an improved conveyor control system and method.

It is a further object of the present invention to provide a control system and method for positioning an object at a desired position on a conveyor.

It is a further object of the present invention to control the positioning of an object on a conveyor regardless of the spacing of the object relative to other objects placed onto the conveyor.

It is a further object of the present invention to control the positioning of an object on a conveyor regardless of the initial or subsequent position of the object relative to a desired stopping position.

It is a further object of the present invention to control the positioning of an object on a conveyor initially traveling at any known velocity on the conveyor.

Other objects, features and advantages of the present invention will become apparent upon review of the following detailed description of a preferred embodiment and the attached drawings.

BRIEF DESCRIPTION OF THE DRAWINGS

FIG. 1 is a diagrammatic side view of a belt conveyor system showing a feed conveyor and an exit conveyor.

FIG. 2 is a diagrammatic side view similar to FIG. 1, showing assorted objects at varying states of movement.

FIG. 3 is a block diagram showing device input signals to the controller and the control signals therefrom.

FIG. 4 is a graphic depiction of a velocity versus time carve.

FIG. 5 is a diagrammatic side view similar to FIG. 1, showing packages at different starting positions.

DETAILED DESCRIPTION

Figure 6:
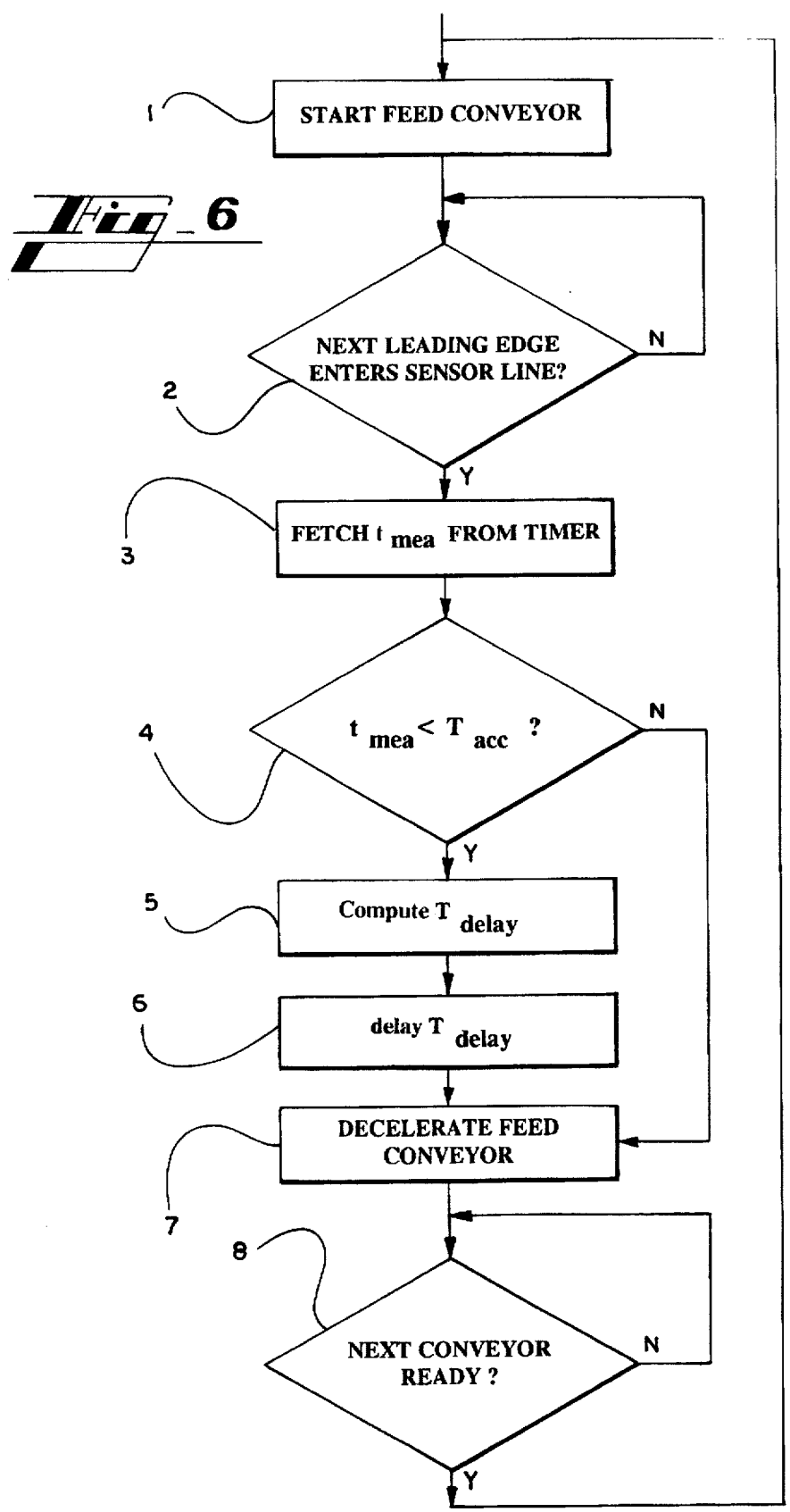
FIG. 6 is a flow diagram of the logic applied in positioning an object adjacent to the exit end of the feed conveyor.

Referring now in more detail to the drawings, in which like numerals refer to like parts throughout the several views, FIG. 1 shows a conveyor control system embodying the present invention. The conveyor control system 10 is composed of a feed conveyor 20 which feeds packages to a destination point, which is the exit end of the feed conveyor 20 directly adjacent to an entry end of a second conveyor 30. As the package 40, as shown in FIG. 1, is transferred along the feed conveyor 20, it is sensed by a detection mechanism 50 and is brought to a stopped position at the exit end 60 of the feed conveyor 20. From the feed conveyor 20, the package 40 is transferred, at a desired interval, to the second conveyor 30.

In the preferred form shown, the destination point is the entry end of the second conveyor 30. It should be understood, however, that the destination point can be a variety of different locations such as awaiting personnel, a chute, or other components in a package handling system capable of receiving a package. It should further be understood that the destination point can be a predetermined position along the feed conveyor 20 prior to the exit end of the feed conveyor 20.

Referring to FIG. 3, the package transfer process is controlled by a controller 70, the function of which will be described in detail below. The controller may be a programmed general purpose personal computer. The controller 70 receives input from the detection mechanism and drive mechanism, described below, associated with the feed conveyor 20 and provides signals instructing the feed conveyor 20 and the second conveyor 30 to operate to transfer a package to the second conveyor 30 in the manner described below in connection with FIG. 6. Methods for programming such a controller to operate the control system disclosed herein are conventional and well known to those skilled in the art.

In the preferred embodiment of the control system 10, shown in FIG. 1, the feed conveyor 20 and the second conveyor 30 are horizontally mounted belt conveyors. It is understood that other types of conveyors may be utilized when desired. A detection mechanism 50 is mounted adjacent to the feed conveyor 20 at a position prior to the exit end 60 of the feed conveyor 20, and operates to detect a package 40 moving past the detection mechanism 50. The detection mechanism 50 may be a conventional photocell transmitter and receiver. As shown in FIG. 1, a drive mechanism 90 is adapted to accelerate and decelerate the feed conveyor 20, and the drive mechanism 100 is adapted to accelerate and decelerate the second conveyor 30. Both drive mechanisms 90 and 100 may be conventional alternating current motors.

Referring now to FIG. 3, the controller 70 receives signal input through an input/output board 110 from the detection mechanism 50. The controller 70 sends signal output through the input/output board 110 and an inverter 120 to the drive mechanisms 90 and 100. The input/output board 110 translates analog signaling to digital signaling and vice versa. The inverter 120 converts direct current signaling from the input/output board 110 to appropriate frequency and voltage parameters required by the drive mechanisms 90 and 100 in accordance with instructions from controller 70. It is understood that the frequency and voltage parameters required by the drive mechanisms 90 and 100 may be preconfigured at the inverter. It is also understood that other types of motor drives such as a vector drive may be utilized instead of the inverter 120.

Operation

As noted above, the controller 70 controls the transfer of packages to the exit end of the feed conveyor 20, and, in the preferred embodiment shown in FIGS. 1 and 3, controls the transfer of packages to the second conveyor 30. The logic used by the controller for transferring a package from the feed conveyor 20 to the second conveyor 30, as described above, is shown in FIG. 6. Generally described, a package 40 to be transferred to the second conveyor 30 at a desired interval is placed on the feed conveyor 20 either automatically from an upstream conveyor or chute system, or manually. A singulated stream of packages may be fed through the feed conveyor 20 with random and varying distances between individual packages. Conventional apparatus for resolving packages on a conveyor into a single file may be utilized upstream from the feed conveyor 20.

Referring now to FIGS. 1 and 6, when a package 40 is placed on the feed conveyor 20, controller 70 begins acceleration of the feed conveyor 20 from rest, at Block 1 of FIG. 6, at a predetermined acceleration rate. When the feed conveyor 20 begins acceleration, controller 70 starts a timer to measure the duration of acceleration. When the leading edge 45 of the package 40 passes the detection mechanism 50 at Block 2 and breaks a light beam produced by the detection mechanism 50, the detection mechanism 50 sends a signal to the controller 70. In response to that signal, the controller 70 measures the elapsed acceleration time of the feed conveyor 20 at Block 3. At Block 4, the controller 70 compares the measured acceleration time with the known time required to accelerate the feed conveyor 20 to a known maximum velocity from rest. If the measured acceleration time is less than the time required to accelerate the conveyor 20 to known maximum velocity, the controller 70 then computes a delay period at Block 5. The calculation of the delay period will be described in detail below.

After the calculated delay period elapses at Block 6, the controller 70 begins deceleration of the feed conveyor 20 at Block 7, at a predetermined deceleration rate. Thus, the controller 70 brings the feed conveyor 20 to a stopped position so that the leading edge 45 of the package 40 is positioned at a desired location, for example the exit end 60 of the feed conveyor 20. At Block 8, when it is desired that the package 40 be transferred to a subsequent location such as to the second conveyor 30, the controller 70 begins acceleration of the feed conveyor 20 at Block 1 to transfer the package 40 onto the second conveyor 30. When the controller 70 begins acceleration of the feed conveyor 20 at Block 1, the package 40 is transferred onto the second conveyor 30, and the controller 70 resets the feed conveyor acceleration timer to zero and begins timing acceleration of the feed conveyor transferring a subsequent package which has been placed on the feed conveyor 20 upstream for ultimate transfer to the second conveyor 30. The process of transferring the subsequent package to the second conveyor 30 is the same as described above for the package 40.

As described above, after the leading edge 45 of the package 40 is detected by the detection mechanism 50 at Block 2, the controller 70 calculates a delay period at Block 5 which is allowed to elapse before the controller 70 decelerates the feed conveyor 20 to a stopped position at Block 7. Described more particularly, the known acceleration and deceleration rates of the feed conveyor 20 are previously stored by the controller 70. Acceleration and deceleration rates of the feed conveyor 20 can be selected at the inverter by presetting the voltage and current frequency parameters for the drive mechanism 90 in a manner known to those skilled in the art. It is readily understood that the deceleration of the feed conveyor 20 may be accomplished by removal of current from the drive mechanism 90. The feed conveyer 20 may also be decelerated by a controlled reduction of current, or braking current, to the drive mechanism 90. It is further understood that the deceleration of the feed conveyor 20 may be accomplished by application of a mechanical brake to the feed conveyor 20.

Referring to FIG. 4, a graphical profile of velocity versus time is presented in which the known feed conveyor acceleration rate is graphically depicted as acceleration curve 140 and the known feed conveyor deceleration rate is graphically depicted as deceleration curve 160. Although these curves are shown as straight lines, they may be nonlinear if the known acceleration or deceleration functions are not linear.

As described above and shown graphically FIG. 4, the detection mechanism 50 is positioned adjacent to the feed conveyor 20 and is spaced prior to the exit end 60 of the feed conveyor 20. The distance 55 between the position of the detection mechanism 50 and the exit end 60 of the feed conveyor 20 is equal to the distance required to decelerate the feed conveyor 20 from a known maximum velocity, shown in FIG. 4, to a stopped position such that a package will be positioned with its leading edge adjacent to the exit end 60 of the feed conveyor 20. As shown in FIG. 2, when the leading edge 45 of the package 40 stops at the exit end 60 of the feed conveyor 20, the leading edge of a subsequent package 47 placed on the feed conveyor 20 upstream of the detection mechanism 50 will not have reached the detection mechanism 50. This can be achieved by making sure that the leading edges of successive packages are separated along the conveyor by a distance greater than the distance between the detection mechanism 50 and the exit end 60 of the feed conveyor 20, or by constructing the feed conveyor so that none of the packages to be handled are shorter than the distance between the detection mechanism 50 and the exit end 60.

As previously described and referring to FIGS. 1 and 6, the controller measures the elapsed acceleration time of the feed conveyor 20 from the time the feed conveyor 20 begins acceleration to the time at which the leading edge 45 of the package 40 is detected by the detection mechanism 50 at Block 2. In response, the controller calculates a delay period at Block 5, during the elapse of which at Block 6, the controller 70 will continue to accelerate the feed conveyor 20 after the leading edge 45 of the package 40 is detected by the detection mechanism 50. At the end of the delay period, the controller will begin deceleration of the feed conveyor 20 at Block 7. The calculated delay period is described as:

$$T_{delay}=T_{dec}(T_{acc}-t_{mea})/(T_{acc}+T_{dec})$$

Where:

$T_{delay}$=calculated delay period;
$T_{dec}$=time required to decelerate feed conveyor 20 from the known maximum velocity to a stopped position;
$T_{acc}$=time required to accelerate the feed conveyor 20 from a stopped position to the known maximum velocity;
$t_{mea}$=measured acceleration time from start up of the feed conveyor 20 to the time when the leading edge 45 of the package 40 is detected by the detection mechanism 50.

Still referring to FIGS. 1 and 6, if the measured acceleration time of the feed conveyor 20 ($t_{mea}$) is long enough for the feed conveyor 20 to have reached the known maximum velocity, the controller 70 begins deceleration of the feed conveyor 20 at Block 7 immediately after the leading edge 45 of the package 40 is detected by the detection mechanism 50 at Block 2. If the measured acceleration time ($t_{mea}$) of the feed conveyor 20 is less than the time ($T_{acc}$) required to accelerate the feed conveyor 20 from a stopped position to the known maximum velocity, the delay period is calculated as described above at Block 5, and the controller continues to accelerate the feed conveyor 20 at Block 6 during the elapse of the delay period. After the elapse of the delay period, the controller 70 begins deceleration of the feed conveyor 20 at Block 7.

Referring now to FIGS. 4, 5 and 6, the control system of the preferred embodiment of the present invention will be .explained in connection with example package transfers. As a first example, assume that a package is placed on the feed conveyor belt with the leading edge at position 170 shown in FIGS. 4 and 5. The acceleration of the feed conveyor 20 is then initiated at Block 1, shown in FIG. 6, by the controller 70 so as to move the leading edge of the package toward the exit end 60 of the feed conveyor 20. When the feed conveyor 20 begins to accelerate, the controller 70 starts the feed conveyor acceleration timer. When the leading edge of the package is detected by the detection mechanism 50 at Block 2, a signal is sent to the controller 70 which stops the timer. The elapsed acceleration time ($t_{mea}$) is measured by controller 70 at Block 3 and, in this example, the measured acceleration time ($t_{mea}$) is equal to the time ($T_{acc}$) required to accelerate the feed conveyor 20 from a stopped position to the known maximum velocity. Accordingly, the controller 70 immediately begins deceleration of the feed conveyor 20 at Block 7 so that the feed conveyor 20 comes to a stopped position with the leading edge of the package adjacent to the exit end 60 of the feed conveyor 20.

Considering now another example, and referring to FIGS. 4, 5 and 6, assume a package is at position 180 on the feed conveyor 20 when controller 70 begins acceleration of the feed conveyor 20 at Block 1. This position, which is a considerable distance from the detection mechanism 50, represents relatively wide inter-package spacing. At Block 4, the measured time of acceleration ($t_{mea}$) of the feed conveyor 20, in this example, will be greater than the time ($T_{acc}$) required to accelerate the feed conveyor 20 to the known maximum velocity. As seen in FIG. 4 the acceleration curve a of the package intersects the maximum velocity line a considerable distance from the detection mechanism 50. Therefore, in this example, the package will reach the known maximum velocity before the leading edge of the package is detected by the detection mechanism 50. Because the measured acceleration time ($t_{mea}$) of the feed conveyor 20 is greater than the acceleration time ($T_{acc}$) required for the feed conveyor 20 to reach the known maximum velocity, the controller 70 will immediately initiate deceleration of the feed conveyor 20 at Block 7.

Considering still another example and referring to FIGS. 4, 5 and 6, assume the leading edge of the package is at position 190 (relatively close to the detection mechanism 50) when the controller 70 begins acceleration of the feed conveyor 20 at Block 1. When the leading edge of the package is detected by the detection mechanism 50 at Block 2, the acceleration time ($t_{mea}$) of the feed conveyor 20 is measured at Block 3, as described above, and is found to be less than the acceleration time ($T_{acc}$) required to accelerate the feed conveyor 20 to the known maximum velocity. Accordingly, a delay period 200, illustrated in FIG. 4, is calculated at Block 5 and the controller 70 continues to accelerate the feed conveyor 20 at Block 6 until the elapse of the calculated delay period. After the elapse of the calculated delay period, the controller 70 begins deceleration of the feed conveyor 20 at Block 7 to bring the feed conveyor 20 to a stopped position with the leading edge of the package adjacent to the exit end 60 of the feed conveyor 20. As shown in FIG. 4, in this example, the acceleration curve of the feed conveyor 20 for the package beginning at position 190 does not intersect the maximum velocity line before the leading edge of the package is detected by the detection mechanism 50. As a result of the continued acceleration of the feed conveyor 20, during the calculated delay period, the acceleration curve, illustrated as a dotted line in FIG. 4, intersects the deceleration curve 110 after the elapse of the calculated delay period. At that time, the controller 70 begins deceleration of the feed conveyor 20 in order to position the leading edge of the package at the exit end 60 of the feed conveyor 20.

In the foregoing examples the desired stop location was the exit end 60 of the feed conveyor. However, it will be apparent from FIG. 4 that the position of the detection mechanism and of the desired stop position can be adjusted to stop packages at any desired location along the feed conveyor.

Additionally, the foregoing describes and exemplifies the present invention in a start/stop configuration where the conveyor 20 is started from rest after a package is placed on the conveyor and is stopped when the package reaches a desired position along the conveyor 20. It should be understood that the present invention may be utilized to position objects on a subsequent conveyor, chute or other component of a material handling system according to a desired spacing. In such a configuration the conveyor 20 may be accelerated from a known starting velocity to a known maximum velocity and then decelerated to a known final velocity such that package 40 is transferred to the second conveyor 30 at a desired interval. It should be further understood that conveyor 20 similarly may be accelerated from a known starting velocity and then brought to a stop such that a package 40 is positioned at a desired position along conveyor 20. It is also understood that the conveyor 20 may be accelerated from a stopped position and then decelerated to a known final velocity such that the package 40 is transferred to the second conveyor 30 at a desired interval.

From the foregoing, it will be understood that the conveyor control system 10 functions to position an object or package at any desired location along a feed conveyor in order to facilitate greater efficiency and timeliness in the transfer of the object or package to a subsequent destination. While this invention has been described in detail with particular reference to the preferred embodiment thereof, it will be understood that modifications and variations may be made without departing from the spirit and scope of the invention as termed in the appended claims.

What is claimed is:

1. A method of positioning an object at a desired position on a conveyor comprising the steps of:

transferring an object from an object source onto a conveyor having a known acceleration rate and a known deceleration rate, at a position prior to said desired position on said conveyor;

accelerating said conveyor at said known acceleration rate beginning at an initial time;

measuring the acceleration time of said conveyor from said initial time to a time when said object reaches a detection point prior to said desired position on said conveyor;

calculating a delay period, after the elapse of which, deceleration of said conveyor, at said known deceleration rate, will result in said object reaching a position adjacent to said desired position on said conveyor;

responsive to the elapse of said calculated delay period, decelerating said conveyor.

2. The method of claim 1, wherein said step of accelerating said conveyor comprises rotating said conveyor so that the velocity of said conveyor increases as a function of said known acceleration rate for said acceleration time.

3. The method of claim 1, further comprising the step of detecting when the leading edge of said object reaches said detection point.

4. The method of claim 1, further comprising calculating said delay period when said object reaches said detection point.

5. The method of claim 1, wherein said step of calculating said delay period comprises comparing (a) said measured acceleration time, (b) a known acceleration time for said conveyor to accelerate from a known starting velocity, at said known acceleration rate, to a known maximum velocity, and (c) a known deceleration time for said conveyor to decelerate, at a known deceleration rate, from said known maximum velocity to a known final velocity.

6. The method of claim 5, wherein said known starting velocity is zero such that said conveyor is accelerated from a stopped position.

7. The method of claim 5, wherein said known final velocity is zero such that said conveyor is decelerated to a stopped position.

8. The method of claim 1, further comprising beginning the elapse of said delay period after said object reaches said detection point.

9. The method of claim 1, further comprising the steps of:

during the elapse of said delay period, continuing to accelerate said conveyor at said known acceleration rate; and after the elapse of said delay period, decelerating said conveyor.

10. The method of claim 1, wherein said step of decelerating said conveyor comprises arresting acceleration of said conveyor after said leading edge of said object reaches said detection point.

11. The method of claim 1, wherein said step of decelerating said conveyor results in said conveyor stopping when said object moves to a position adjacent to said desired position on said conveyor.

12. The method of claim 1, wherein said step of decelerating said conveyor comprises braking the forward motion of said conveyor.

13. The method of claim 12, wherein said braking causes said conveyor to decelerate at a known deceleration rate.

14. The method of claim 1, wherein said step of decelerating said conveyor comprises allowing said conveyor to decelerate due to the internal friction of the moving parts of said conveyor.

15. The method of claim 14, wherein said internal friction of said moving parts of said conveyor causes said conveyor to decelerate at said known deceleration rate.

16. The method of claim 1, wherein said desired position comprises the exit end of said conveyor.

17. A system for positioning an object at a desired position on a conveyor, comprising:

a drive mechanism for operating a conveyor having a known acceleration rate and a known deceleration rate;

a detection mechanism operative to detect movement of said object past a detection point along said conveyor;

a controller programmed and adapted to control said drive mechanism in order to accelerate and decelerate said conveyor;

said controller being responsive to said detection mechanism and being further programmed
      to begin acceleration of said conveyor,
      to measure the acceleration time of said conveyor from a start time to a time at which said object reaches said detection point,
      to calculate a delay period after the elapse of which deceleration of said conveyor, at said known deceleration rate, will result in said object reaching a position adjacent to said desired position on said conveyor; and
      to decelerate said conveyor at said known deceleration rate at the end of said delay period.

18. The system of claim 17, wherein said conveyor is a belt conveyor driven by an alternating current motor.

19. The system of claim 17, wherein said detection mechanism comprises at least one photo cell relay.

20. The system of claim 17, further comprising an input/output means for translation of signaling between said controller and each of said detection mechanism and said drive mechanism.

21. The system of claim 17, further comprising a means for directing said drive mechanism responsive to signaling from said controller.

22. The system of claim 17, wherein said controller comprises a programmable computer.

23. The system of claim 17, wherein said controller is programmed to decelerate said conveyor to a stop when said object reaches a position adjacent to said desired position on said conveyor.

24. The system of claim 17, wherein said desired position comprises the exit end of said conveyor.

25. The system of claim 17, further comprising means for braking movement of said conveyor, said braking means causing deceleration of said conveyor at said known rate.

26. The system of claim 25, wherein said braking means is responsive to said controller.

* * * * *